C. L. MERRY.
LENS MEASURING INSTRUMENT.
APPLICATION FILED OCT. 24, 1911.
1,043,954.
Patented Nov. 12, 1912.
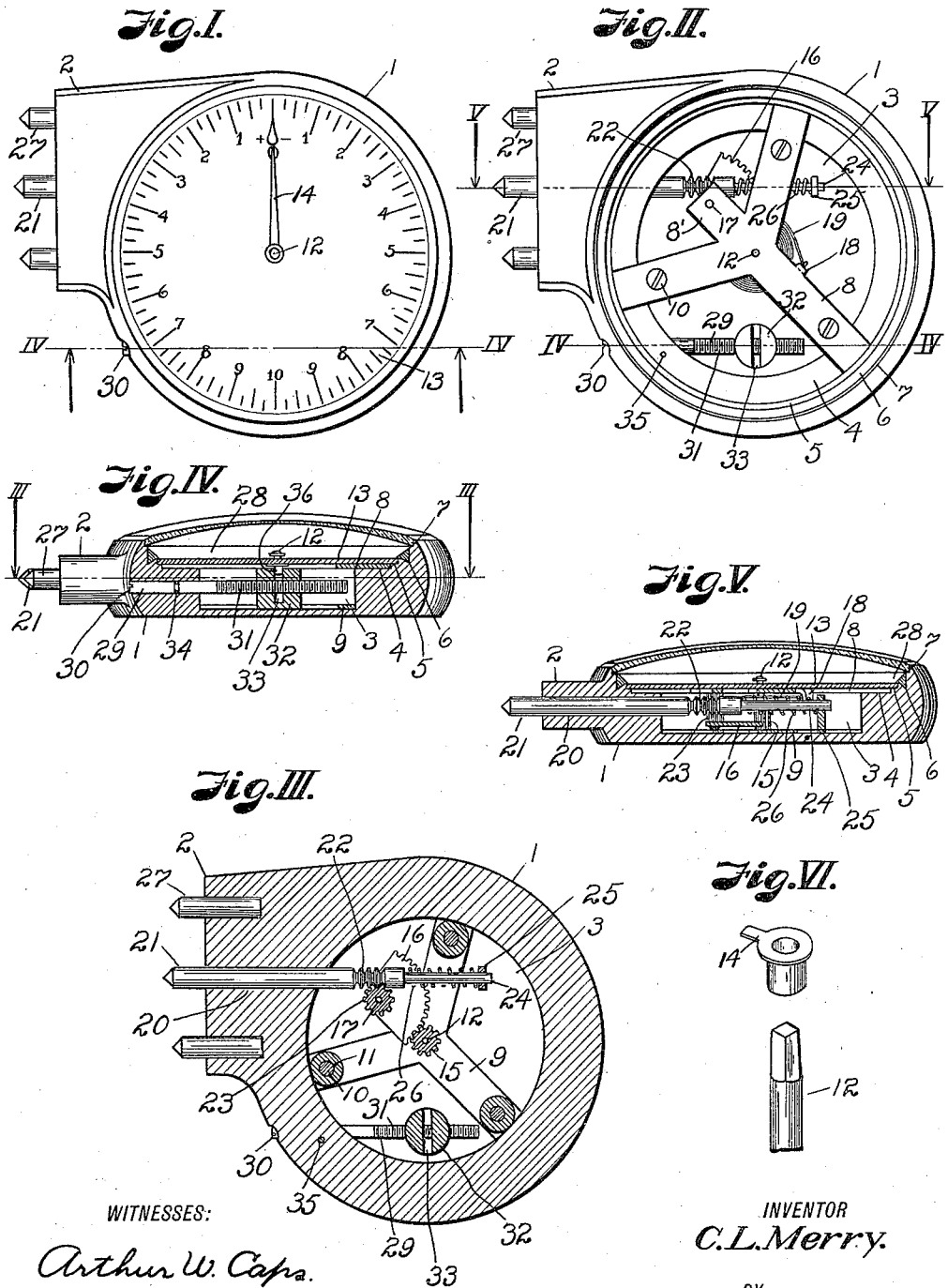
WITNESSES:
Arthur W. Caps.
INVENTOR
C. L. Merry.
BY
Arthur C. Brown
ATTORNEY
COLUMBIA PLANOGRAPH CO., WASHINGTON, D. C.

UNITED STATES PATENT OFFICE.

CHARLES L. MERRY, OF KANSAS CITY, MISSOURI.

LENS-MEASURING INSTRUMENT.

1,043,954.  Specification of Letters Patent.  Patented Nov. 12, 1912.

Application filed October 24, 1911. Serial No. 656,530.

*To all whom it may concern:*

Be it known that I, CHARLES L. MERRY, a citizen of the United States, residing at Kansas City, in the county of Jackson and State of Missouri, have invented certain new and useful Improvements in Lens-Measuring Instruments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a lens measuring instrument, and more particularly to an instrument for measuring the curvature of spherical and cylindrical lenses and indicating such curvature on a dial marked to show local measurements.

The principal objects of the present invention are to provide an instrument of this character which may be conveniently applied to a mounted lens; in which the movable contact member is balanced to relieve the indicator control spring, and which comprises mechanism for adjusting the dial. In accomplishing these objects, I have provided the improved details of structure hereinafter described and illustrated in the accompanying drawings, wherein:—

Figure I is a face view of a measuring instrument constructed according to my invention. Fig. II is a similar view with the dial removed. Fig. III is a similar view with the bridge removed, the case being in section on the line III—III, Fig. IV. Fig. IV is a cross section on the line IV—IV, Fig. I, showing the dial adjusting mechanism. Fig. V is a cross section on the line V—V, Fig. II, showing the free measuring pin. Fig. VI is a detail view of the indicator mounting.

Referring more in detail to the parts:—1 designates the case of the instrument, which is preferably circular and has a head 2 arranged eccentrically to the body, that is, extended from the body portion of the case perpendicularly to a base diameter, and with its major portion at one side of a diameter extending at a right angle to the base diameter; one edge of the head being preferably tangential to the body, as shown.

Within the body 1 is a socket 3 having a bridge seat 4 at its upper end, a dial seat 5 above the bridge seat, a clamp socket 6 above the dial seat, and a shoulder 7 for receiving a crystal.

Mounted on the seat 4 is a bridge 8 which extends across the socket 3 and is spaced from a lower bridge 9, that seats in the bottom of the socket 3, by pins 10 and elongated washers 11.

Journaled in the central portions of the bridges 8 and 9 is a pin 12 which extends upwardly through a dial 13 that is mounted on the seat 5, and carries an indicating pointer 14.

Fixed on the pin 12 is a pinion 15, and meshing with said pinion is a gear sector 16 which is fixed on a pin 17, that is journaled in the base of the body 1 and in a projection 8' on the bridge 8.

Fixed to the central pin 12 and to a boss 18 on the bridge 8, is a helical spring 19 which is adapted for yieldingly retaining the pin 12 in a set position with the sector 16 at one limit of its travel.

Slidably mounted in a bore 20 that extends centrally through the head 2 and into the body socket 3, is a pin 21 having a rack portion 22 meshing with a pinion 23 on the sector pin 17, and having a reduced shank 24 extending through an aperture in a boss 25 that projects from the bottom of the socket 3.

Surrounding the shank 24 and bearing against the shoulder of the pin and against boss 25 is a spring 26 which is adapted for yieldingly tensioning the pin outwardly to set position and for relieving the small spring 19 from the burden of actuating the sector and pin to return the latter to set position after each operation.

Fixed in and projecting from head 2 are studs 27 which are arranged at the sides of pin 21 and in alinement therewith; the pin 21 being so arranged that when in its set position its point will be projected beyond the plane of the points of pins 27, so that if the three points were placed against a perfectly plain surface the pin 21 would be moved inwardly and actuate the pointer.

The dial 13, which is preferably held in place by the ring 28, has suitable graduations which are preferably adapted for measuring the curvature of the lens in diopters, the graduations preferably starting from a zero point and being numbered from 1 upwardly both to the right and left of zero, so that in measuring a plane surface the indicator point will stand at zero; in measuring a convex lens having a curvature of one diopter the indicator will point to the figure 1 at the left of the zero mark, and in measuring a concave lens having a curvature of one diopter, the indicator will point to figure 1 at the right of zero.

In order to adjust the instrument to secure proper reading, I provide means for moving the dial to register with the indicator, comprising a screw 29 having a head 30 accessible in the rim of the body of the instrument, and a threaded shank 31 which extends into the socket 3 and carries a block 32, having a cross slot 33, the screw being provided with a peripheral groove 34 into which a pin 35 on the case projects to prevent longitudinal movement of the screw without interfering with the revolution thereof.

On the inner face of the dial 13 is a pin 36 which projects into the slot in block 32, so that when the block is moved by the screw 29, the dial will revolve to vary the position of the zero mark.

In order to hold the indicator hand or pointer firmly on the pin 12, I prefer to square the upper end of the pin and provide the base of the pointer with a soft metal collet having a round aperture, so that the collet may be forced over the pin and shape itself thereto.

When in use, the instrument may be held naturally in one hand and moved laterally against a lens to bring the points in contact with the surface thereof, the eccentrically mounted head enabling the user to bring the instrument in contact with the lens in a spectacle mounting much more easily and with greater accuracy than if the head were projected directly from the body. When the pins contact the surface of a lens having a curvature, the central pin is moved inwardly and moves the indicator point through the gearing heretofore described, and against the tension of the coil spring 26 and hair spring 19, so that the indicator point moves to the graduation showing the curvature of the lens in diopters. After the lens has been measured the contact of the pins with the lens surface is broken and the coil spring 26 moves the pin back to set position, the presence of the spring 26 relieving the hair spring 19 from the burden of carrying the pin, and equalizing shocks which would tend to affect a delicate spring of that kind.

Should the instrument be thrown out of adjustment in any way, the screw 29 is manipulated to move the block 32 forward or back and revolve the dial in the proper direction to register the indicator point at zero, when the points are contacting a plane surface. By extending the screw to the exterior of the body, it is possible in this way to readjust the instrument without removing the dial or in any way disarranging other parts.

Having thus described my invention, what I claim as new therein and desire to secure by Letters-Patent is:—

1. In a lens measuring instrument, a case having an eccentrically arranged head portion, an indicator, contact devices carried by the head, and means operatively connecting one of the contact devices with the indicator, for the purpose set forth.

2. In a lens measuring instrument, a case having a head projecting laterally therefrom with one edge of the head tangential with the case, an indicator, a contact member projecting from the head, and connection between the indicator and contact member.

3. In a lens measuring instrument, the combination with a suitable case, of a longitudinally movable pin, an indicator, means connecting the pin and indicator for actuating the latter upon the reciprocation of the former, a spring for returning the pin, and a second spring engaged directly by said pin adapted for directly receiving initial thrust from the pin, for the purpose set forth.

4. In a lens measuring instrument, the combination with a suitable case having a socket, an indicator, a reciprocatory pin having operative connection with the indicator and having a reduced shank portion, a boss in said case, and a spring coiled on the pin shank between the body of the pin and said boss, for the purpose set forth.

5. In a lens measuring instrument, the combination with a case comprising a movable dial, of a pointer adapted for travel over the dial, means for actuating said pointer, a screw extending through the case and accessible from the exterior thereof, and means on said screw for actuating the dial.

6. In a lens measuring instrument, the combination with a case, of a movable dial, a pointer adapted for travel over the dial, means for actuating said pointer, a screw extending through the case, means for anchoring said screw against longitudinal movement, a block carried by said screw, and means on said dial engaging the block, for the purpose set forth.

7. In a lens measuring instrument, the combination with a case having a movable dial, of a screw extending through said case, means for anchoring said screw against longitudinal movement, a sliding block having threaded connection with the screw, and a pin on said dial engaging said block, for the purpose set forth.

8. In a lens measuring instrument, the combination with a case having a movable dial, of a screw extending into the case, a block having threaded connection with said screw and provided with a cross groove adjacent to the dial, and a pin on said dial projecting into said groove, for the purpose set forth.

9. The combination with a case having a socket, a movable dial on said case, a screw extending through said case into the socket and having a peripheral groove, a pin on said case projected into said groove, a block slidably mounted within the case, having threaded mounting on said screw and provided with a cross groove adjacent to the dial, and a pin on said dial projected into the block groove, for the purpose set forth.

10. In a lens measuring instrument, the combination with a dial, of a movable contact pin, a revoluble pin having operative connection with the contact pin and having a squared end, and an indicating pointer having a soft metal collet forced onto the squared end of said last named pin, substantially as set forth.

In testimony whereof I affix my signature in presence of two witnesses.

CHARLES L. MERRY.

Witnesses:
ARNOLD F. MEGEDE,
ARTHUR C. BROWN.

Copies of this patent may be obtained for five cents each, by addressing the "Commissioner of Patents, Washington, D. C."